United States Patent
Jennings

(10) Patent No.: US 7,779,304 B2
(45) Date of Patent: Aug. 17, 2010

(54) DIAGNOSING CHANGES IN APPLICATION BEHAVIOR BASED ON DATABASE USAGE

(75) Inventor: Derek M. Jennings, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/763,500

(22) Filed: Jun. 15, 2007

(65) Prior Publication Data

US 2008/0313498 A1 Dec. 18, 2008

(51) Int. Cl.
*G06F 11/00* (2006.01)
(52) U.S. Cl. .................... 714/38; 707/202; 717/124
(58) Field of Classification Search ............ 714/25, 714/38; 707/202; 717/124
See application file for complete search history.

(56) References Cited

U.S. PATENT DOCUMENTS

| | | | |
|---|---|---|---|
| 6,804,627 B1 * | 10/2004 | Marokhovsky et al. ...... | 702/182 |
| 7,171,519 B2 * | 1/2007 | Huras et al. .................. | 711/118 |
| 2002/0165998 A1 * | 11/2002 | Hrebejk et al. .............. | 709/318 |
| 2005/0154695 A1 * | 7/2005 | Gonzalez et al. ............... | 707/1 |

* cited by examiner

*Primary Examiner*—Philip Guyton
(74) *Attorney, Agent, or Firm*—Dillon & Yudell LLP

(57) ABSTRACT

Applications that utilize a database are managed through the use of meta-metadata. The database contains multiple database objects. Each database object has metadata that describes one or more operational characteristics of that database object. Each metadata has an associated meta-metadata, which describes a variance to the metadata. An application program is provided access to one or more database objects. If a change in behavior occurs for the application program that has accessed the database objects, the meta-metadata for the accessed database objects is correlated with the application program accessing the database objects.

20 Claims, 8 Drawing Sheets

DIAGNOSING CHANGES IN APPLICATION BEHAVIOR BASED ON DATABASE USAGE

BACKGROUND OF THE INVENTION

1. Technical Field

The present disclosure relates in general to the field of computers, and more particularly to the use of computer software. Still more particularly, the present disclosure relates to the use of meta-metadata to diagnose problems associated with application usage of a distributed database.

2. Description of the Related Art

From a high-level perspective, a computer can be viewed as a collection of hardware resources that, under the direction of an operating system, executes software application code to manipulate data. An exemplary form of such data is found in a database object, which may be from a distributed database.

SUMMARY OF THE INVENTION

Applications that utilize a database are managed through the use of meta-metadata. The database contains multiple database objects. Each database object has metadata that describes one or more operational characteristics of that database object. Each metadata has an associated meta-metadata, which describes a variance to the metadata. An application program is provided access to one or more database objects. If a change in behavior occurs for the application program that has accessed the database objects, the meta-metadata for the accessed database objects is correlated with the application program accessing the database objects.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
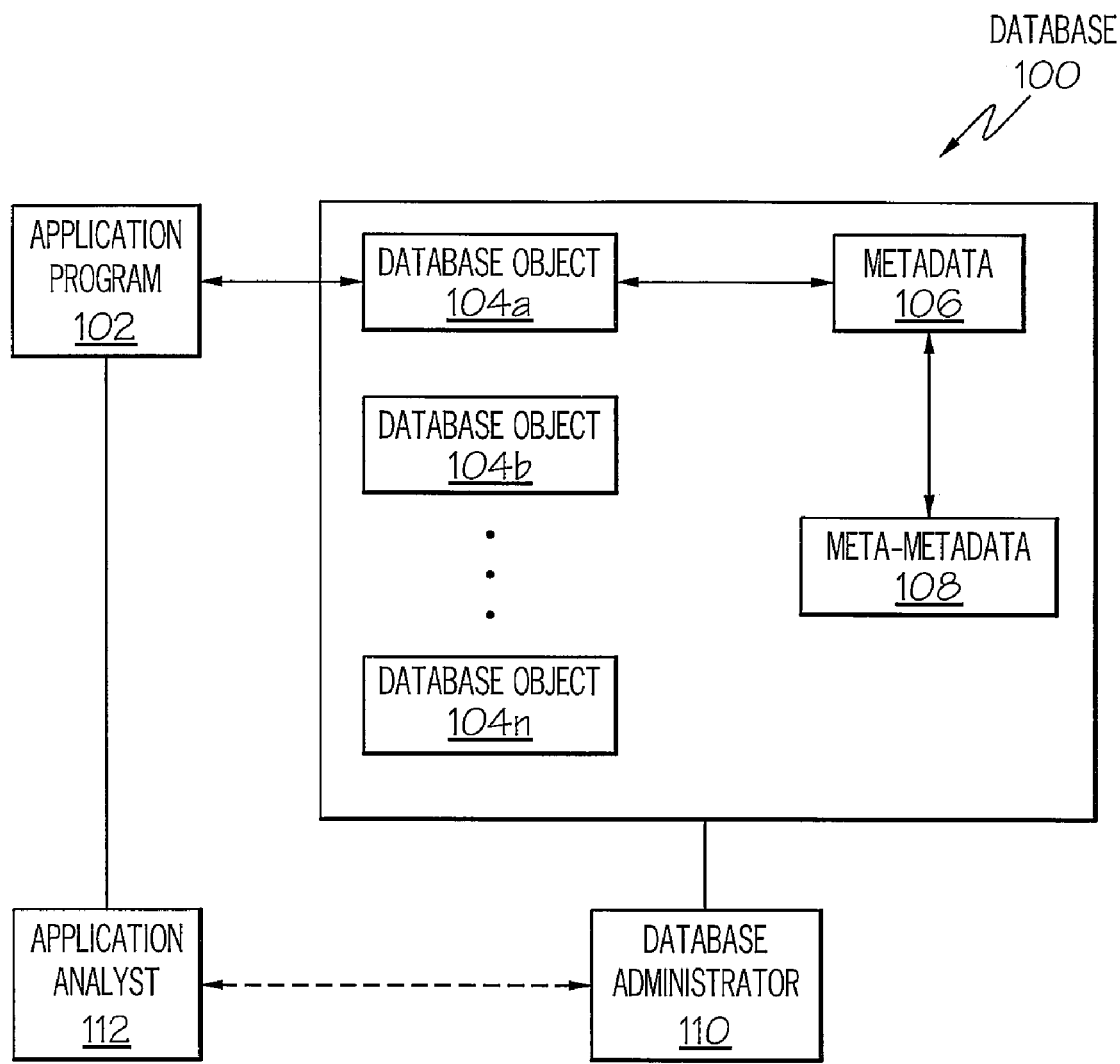
FIG. 1 depicts a relationship among an application program, a database object, metadata and meta-metadata.

With reference now to the figures, and in particular to FIG. 1, there is depicted a relationship diagram showing the interactions between a database 100 and an application program 102. Database 100 contains multiple database objects 104a-n, wherein "n" is an integer suggesting a finite number of database objects. Database objects 104a-n may be similar or disparate types and sizes of database objects, such as tables, fields, strings, etc.

As depicted, application program 102 is able to access a database object 104a found in database 100. Associated with each database object are one or more metadata 106, to which is associated one or more meta-metadata 108. For purposes of simplicity, only the metadata 106 and meta-metadata 108 for database object 104a are shown.

Metadata 106 is data that describes data found in the database object 104a. Examples of such metadata include, but are not limited to, the size of database object 104a; how often database object 104a is accessed in an indexed manner (i.e., a particular line of data is accessed by going directly to an indexed address); how often database object 104a is accessed in a sequential manner (i.e., starting at the top of the database object and looking at every entry until the desired data is hit), etc.

Meta-metadata 108 is data about metadata 106. Corresponding examples of such meta-metadata 108 include, but are not limited to, the rate of change in size of database object 104a; a rate of change in how frequently database object 104a is accessed in an indexed manner; a rate of change in how frequently database object 104a is accessed in a sequential manner, etc.

Note that application program 102 is monitored by an application analyst 112. Similarly, database 100 is monitored by a database administrator 110, who is able to communicate with application analyst 112. Thus, if application analyst 112 notes a degradation or even a neutral change in the behavior of application program 102, application analyst 112 can send a query to the database administrator 110 about information provided by meta-metadata 108. Such information is proprietary to the database administrator 110, but can now be used in accordance with the presently disclosed method.

Figure 2A:
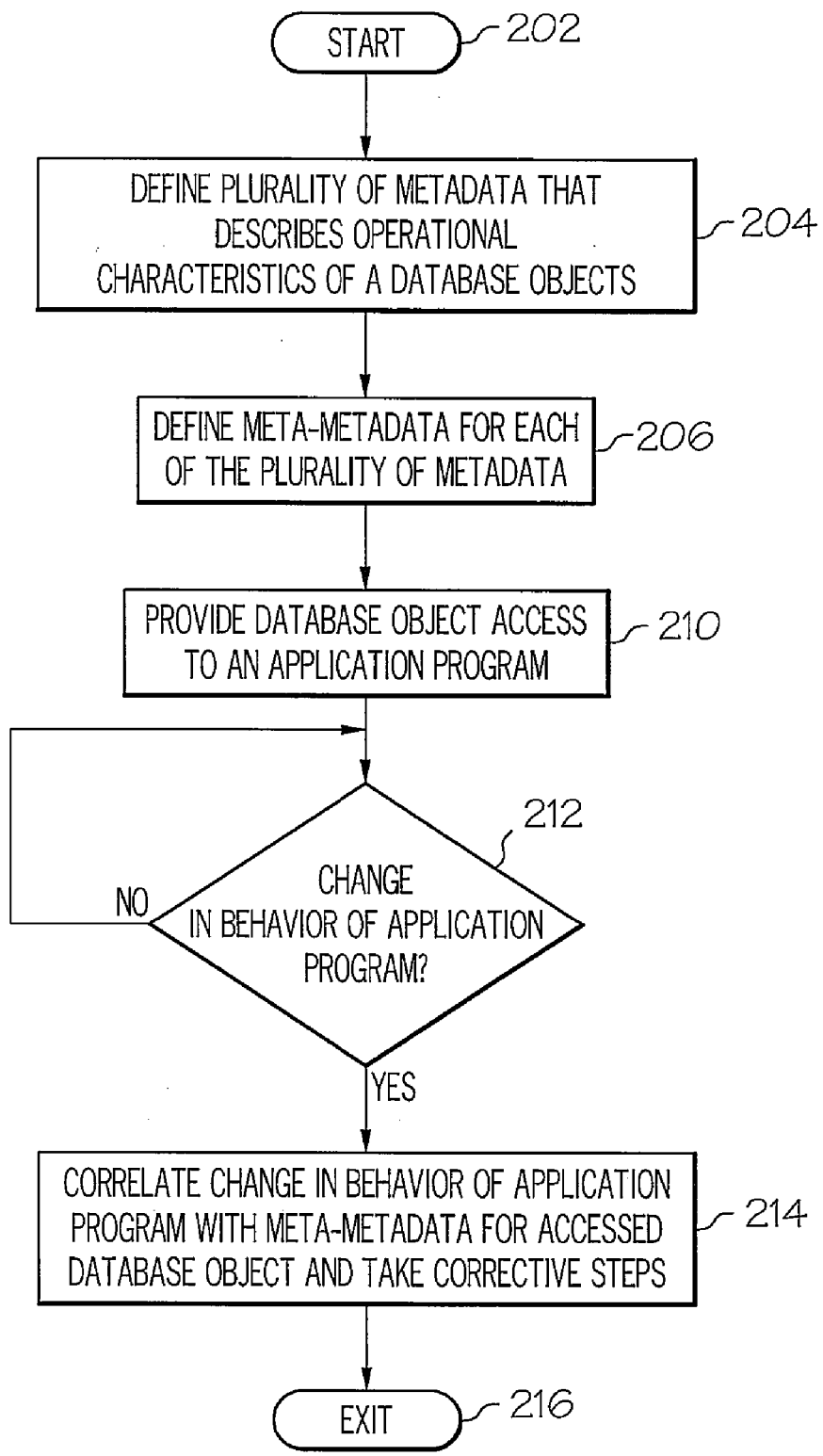
FIGS. 2A-B are flow-charts of exemplary steps taken to manage, through the use of meta-metadata and an expert system, applications that access database objects.
Figure 2B:
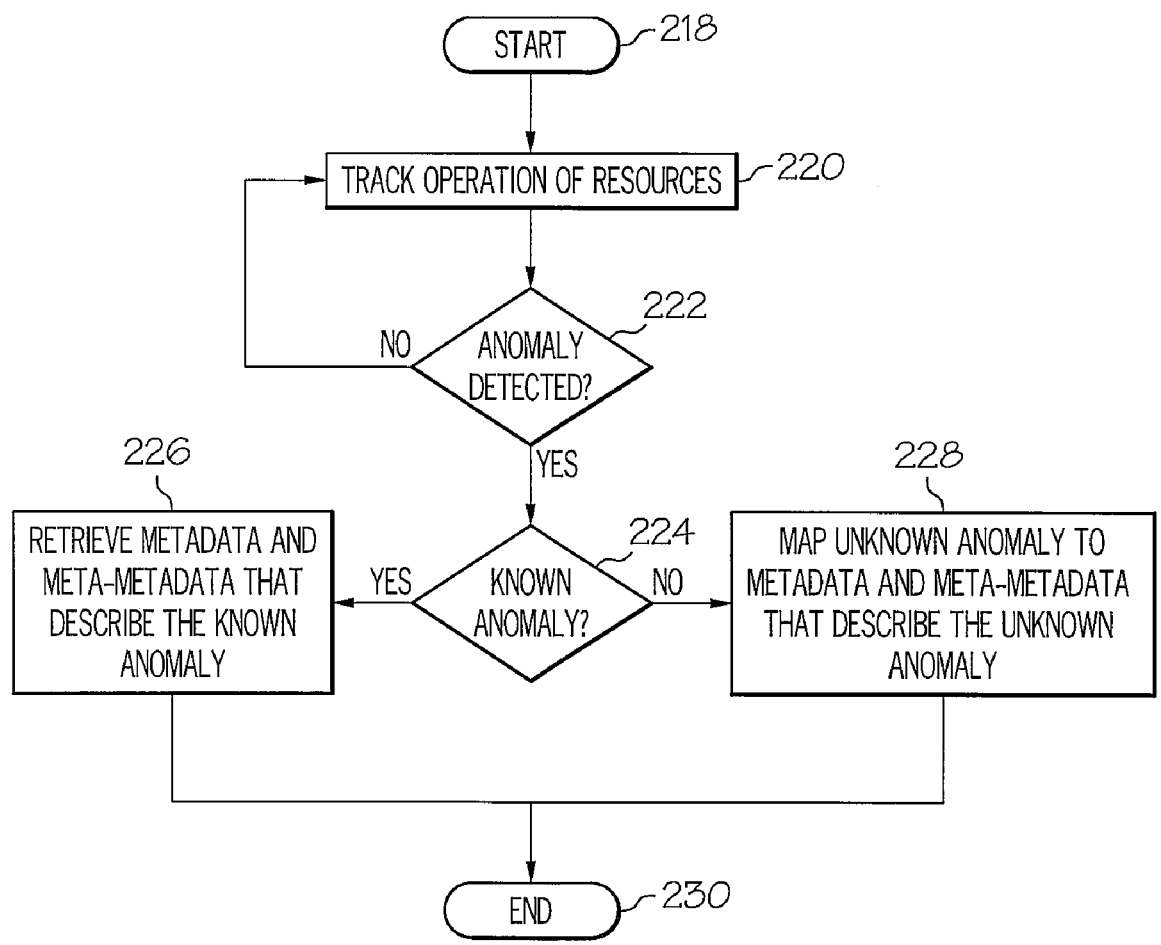

With reference now to FIGS. 2A-B, a high-level flow-chart of exemplary steps taken to manage application software is presented. After initiator block 202, which may be prompted by bringing a database on-line or any other initiator action, a metadata (as defined an described above in an exemplary manner) is defined for each database object (block 204). Thereafter, meta-metadata (as defined and described above in an exemplary manner) is defined for each metadata (block 206).

Access to one or more database objects (e.g., a table) is provided to an application program (block 210). A query is then made as to whether the behavior of the application program changes (query block 212). For example, assume that an application program starts running slower. An application manager can send a request (either manually or automatically in response to the degradation in the performance of the application program) to a database manager, requesting meta-metadata information about the database objects being used. If the meta-metadata shows that the accessed database object has been experiencing an unusually high number of sequential data requests, then the application manager and/or database manager can take corrective steps based on a correlation between the problem with the application program and the meta-metadata (block 214). For example, the application manager can re-write the application to make requests indexed instead of sequential, and the database manager can add logic to add more cache logic for capturing previously requested data. In addition, after checking a configuration to see what level of alerting is required (based upon the type of problem found, or the criticality of the objects involved), an alert message is sent to the appropriate persons and/or computing resources. The process ends at terminator block 216.

The steps taken in query block 212 are expanded upon and further explained in the flow-chart shown in FIG. 2B. After initiator block 218 (which is invoked with the steps shown in query block 212 are initiated), the operation of resources within a system are tracked (block 220). These resources are software objects, which have or are capable of having the metadata and meta-metadata as described herein. If an anomaly is detected in the software object (query block 222), then a determination is made as to whether the anomaly is known or unknown (query block 224).

There are several methods by which an anomaly may be detected. For example, a flag may be set for a particular resource. This flag may be based upon clip level exceptions for a rate of growth of resource usage (e.g., memory resources, computing time, etc.), a rate of increase/decrease in certain types of accesses, and/or other proactive problem determination techniques that are established by a system engineer for monitored resources, etc. These flags thus become part of a library of metadata and meta-metadata for different anomalies.

If the anomaly is known, then the process simply retrieves the metadata and meta-metadata for that known anomaly (block 226), and the sub-process ends (terminator block 230, at which point the main process continues at block 214). An anomaly can be identified as "known" by comparing an above-described flag with a table of flags and anomalies.

However, if the anomaly is unknown, then a new entry in the table of flags and anomalies is entered, thus mapping the unknown anomaly to the metadata and meta-metadata that describe the previously unknown anomaly (block 228).

Note that the corrective steps may be applied to other applications as well. This corrective action may be in the form of several paradigms. For example, if a second application reports a same problem as the first application (which caused the initial correlation between the application's operation and the meta-metadata), then the meta-metadata can be pulled from a pre-recorded correlation table, thus suggesting to the application/database managers that the same problem is recurring.

Note that the corrective action may include sending an alert to the application manager and/or database manager. Such an alert may be describing a meta-metadata that exceeds a pre-defined level. For example, if the meta-metadata for a table indicates that the table has grown more than 50% in a single day, then an alert may be sent to the database manager (even if the application program has experienced no performance anomalies) and/or to the application manager (to explain the cause of a degradation in the performance of the application or to warn of a likely future degradation in performance).

Note also that changes in meta-metadata can be used with application behavior changes that are not deleterious to the application's health. For example, an application program may suddenly start functioning more efficiently (e.g., using less CPU time, less memory, outputting data more quickly, etc.). This increase in efficiency may then be correlated with changes in the meta-metadata, thus providing guidance to both application and database management.

Note also that changes in the behavior of the application program may be changes to interactions with other programs. For example, assume that a first application program suddenly starts making unexpected (e.g., unplanned or even un-programmed) calls to a second application program. Such calls may be the result of an anomaly in the database being used by the first application program. Meta-metadata may provide information about a correlation, if not a cause, of the first application program's call to the second application program.

Similarly, the correlation between the meta-metadata and an anomaly in the performance of the application program can be used to improve a fault-tree or similar fault diagnosis program. For example, a fault-tree can be modified to show that every time a particular meta-metadata value occurs, a corresponding anomaly in the performance of application program will occur in a certain percentage of correlation occurrences.

Figure 3:
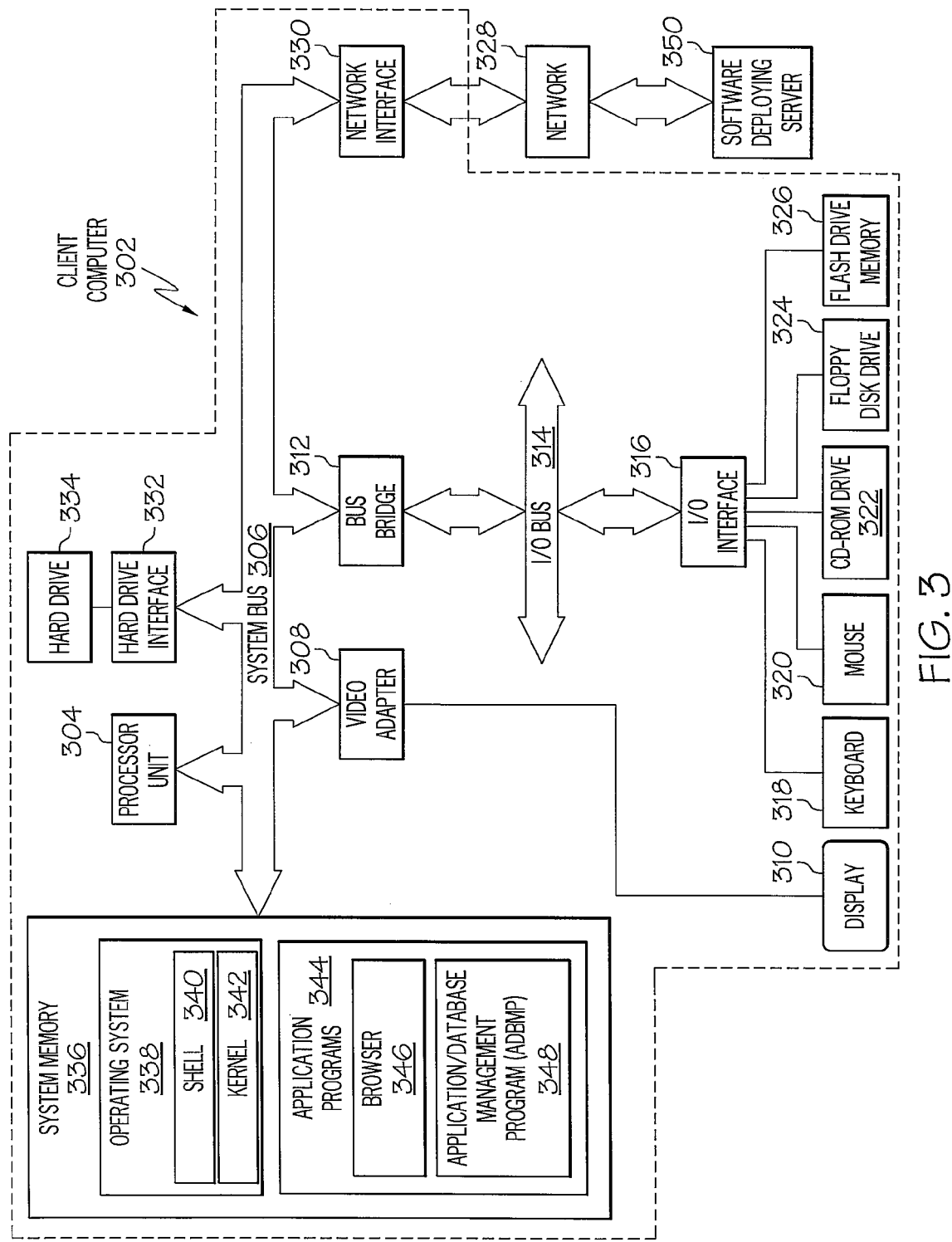
FIG. 3 illustrates an exemplary computer in which the present invention may be utilized.

With reference now to FIG. 3, there is depicted a block diagram of an exemplary client computer 302, in which the present invention may be utilized. Note that some or all of the exemplary architecture shown for client computer 302 may be utilized by encryption logic 208, decryption logic 214, data center VPN server 218, database server 226 and corporate database 228 shown in FIG. 2, as well as software deploying server 350 shown in FIG. 3.

Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 350 via a network 328 using a network interface 330, which is coupled to system bus 306. Network 328 may be an external network such as the Internet, or an internal network such as an Ethernet or a Virtual Private Network (VPN). Note the software deploying server 350 may utilize a same or substantially similar architecture as client computer 302.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 350.

Application programs 344 in client computer 302's system memory (as well as software deploying server 350's system memory) also include an Application/Database Management Program (ADBMP) 348. ADBMP 348 includes code for implementing the processes described in FIGS. 1-2. In one embodiment, client computer 302 is able to download ADBMP 348 from software deploying server 350.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 350 performs all of the functions associated with the present invention (including execution of ADBMP 348), thus freeing client computer 302 from having to use its own internal computing resources to execute ADBMP 348.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of ADBMP 348, are performed by service provider server 350. Alternatively, ADBMP 348 and the method described herein, and in particular as shown and described in FIGS. 1-2, can be deployed as a process software from service provider server 350 to client computer 302. Still more particularly, process software for the method so described may be deployed to service provider server 350 by another service provider server (not shown).

Figure 4A:
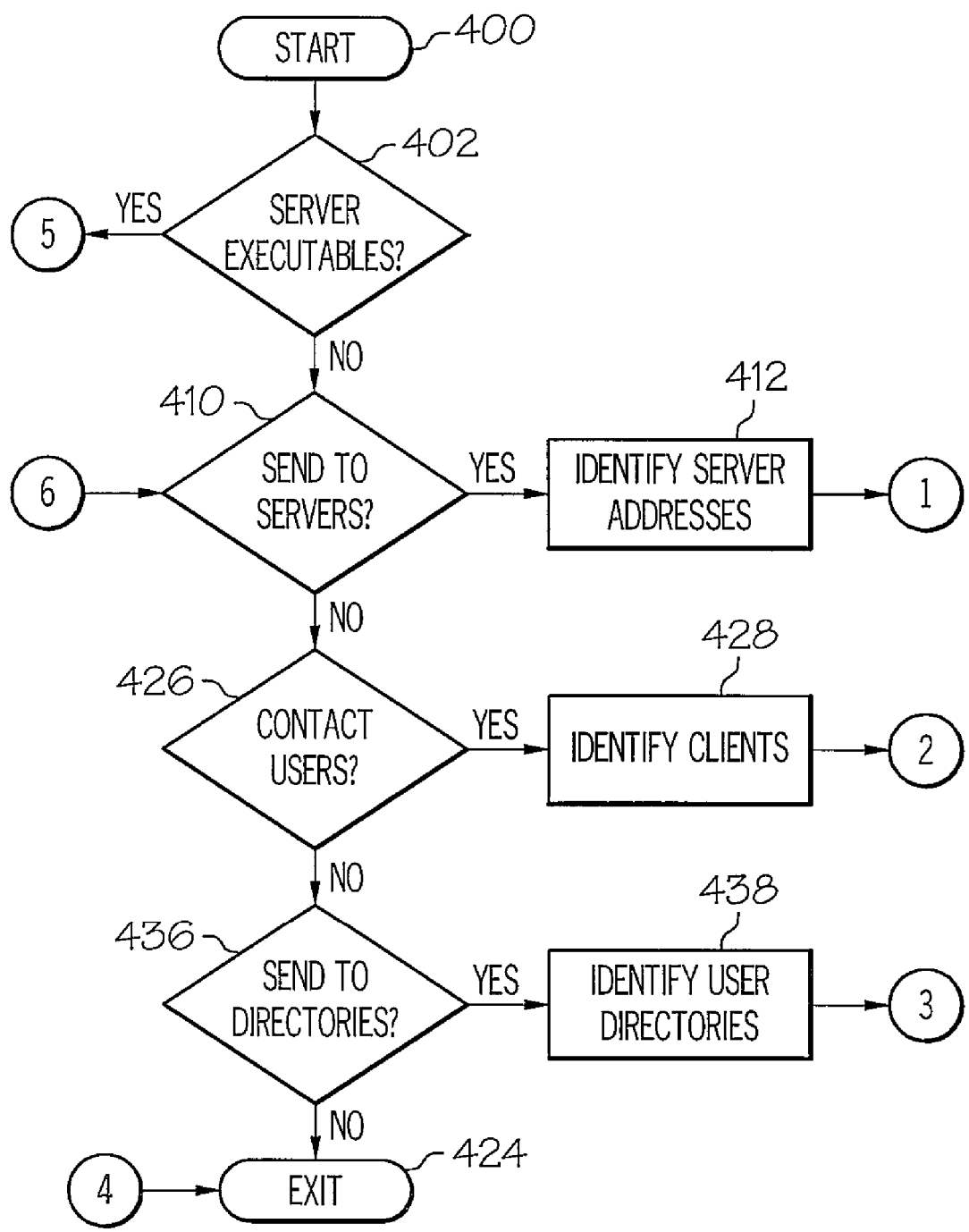
FIGS. 4A-B are flow-charts showing steps taken to deploy software capable of executing the steps described in FIG. 2.
Figure 4B:
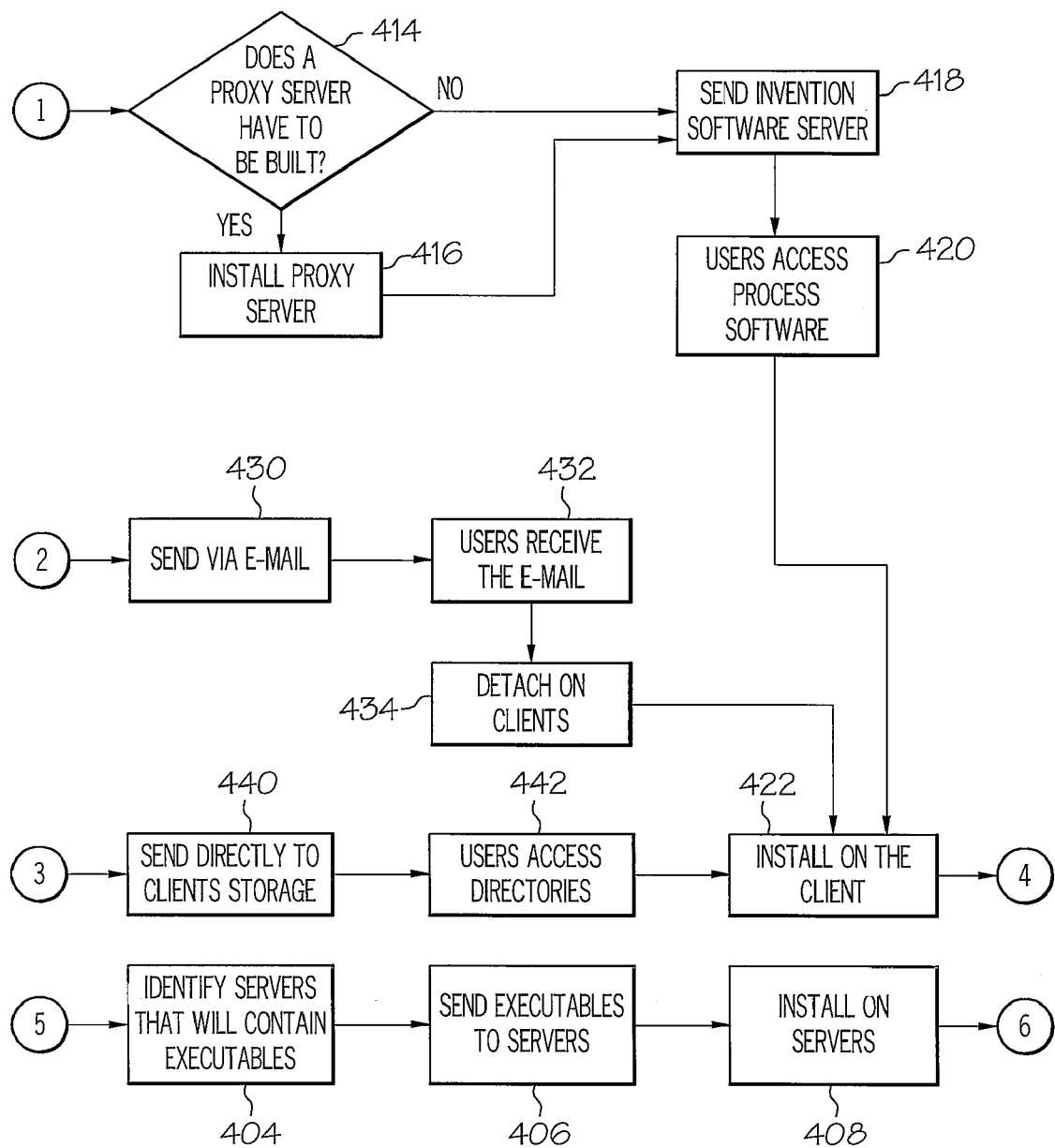

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
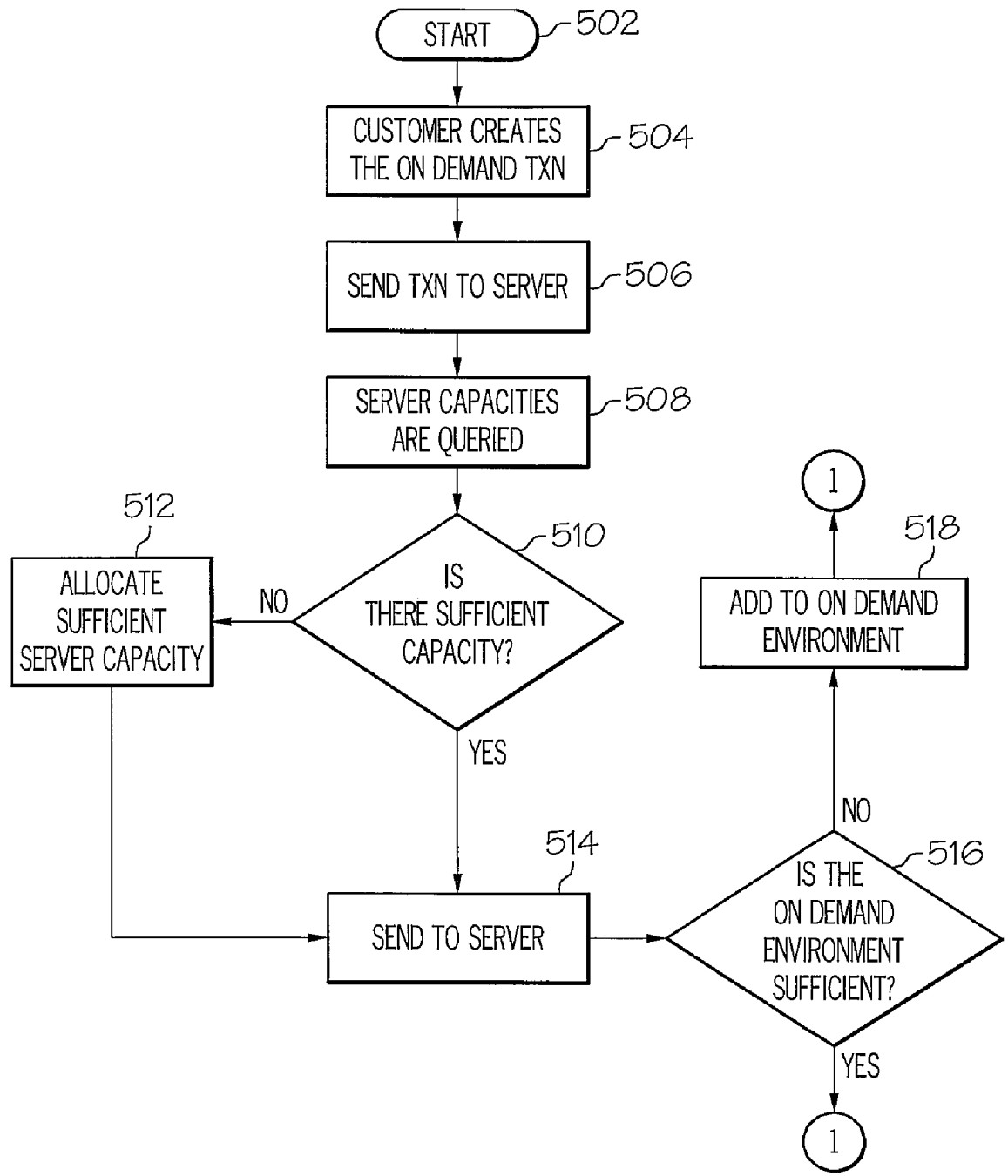
FIGS. 5A-B are flow-charts showing steps taken to execute the steps shown in FIG. 2 using an on-demand service provider.
Figure 5B:
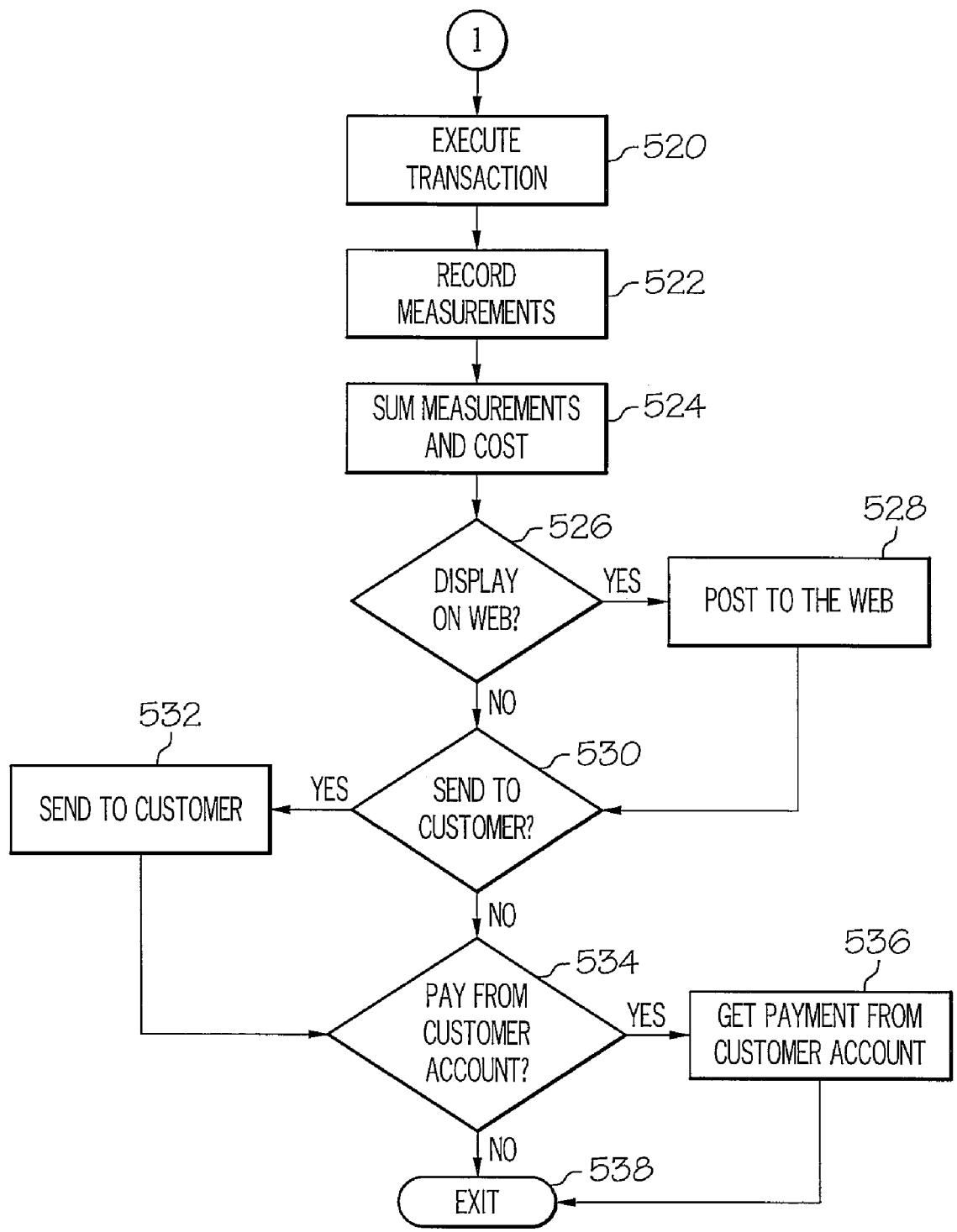

With reference now to FIGS. 5a-b, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the servers available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On. Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

As described herein, the present invention provides a method, system, and computer-readable medium for managing applications that utilize a database. In a preferred embodiment, the method includes defining a plurality of metadata that describe operational characteristics of a database object (e.g., a table). Based on the defined plurality of metadata, meta-metadata is then defined for each metadata in the plurality of metadata. This meta-metadata describes a metadata variance for each metadata in the plurality of metadata. Access to the database object is then provided to a first application program. If the first application program experiences a change in behavior, then a correlation is made between that change in behavior and the meta-metadata. This affords the capability of diagnosing a cause of the change in application behavior of the first application program, wherein the cause is based on the meta-metadata.

In another embodiment, the method includes the additional step of identifying a second application program that is executing whenever the change in application behavior to the first application occurs in conjunction with the meta-metadata. Thereafter, a fault-diagnosis routine, such as a fault tree, can be modified based on identifying the second application program executing, wherein the fault-diagnosis routine identifies a feature of the database object that caused the change in the behavior of the first application program.

In another embodiment, the method also includes the step of identifying a computer resource that is being utilized whenever the change in application behavior to the first application occurs in conjunction with the meta-metadata. Based on this information, a fault-diagnosis routine (including a fault tree) can be modified based on identifying the computer resource that is being utilized, wherein the fault-diagnosis routine identifies a feature of the database object that caused the change in the behavior of the first application program. Examples of such identified computer resources include, but are not limited to, a memory in a client computer that is executing the first application, and a processor that is executing the first application.

In one embodiment, the operational characteristic of the database object describes a size growth of the database object. In this scenario, the metadata variance may be a rate of change of the size growth of the database object, and wherein the meta-metadata describes the rate of change of the size growth of the database object.

In another embodiment, the operational characteristic of the database object describes a frequency of serial accesses of data in the database object. In this scenario, the metadata variance may be a rate of change of the frequency of serial access of data in the database object, and wherein the meta-metadata describes the rate of change of the frequency of serial accesses of data in the database object.

In another embodiment, the operational characteristic of the database object describes a frequency of indexed accesses of data in of the database object. In this scenario, the metadata variance may be a rate of change of the frequency of indexed accesses of data in the database object, and wherein the meta-metadata describes the rate of change of the frequency of indexed accesses of data in the database object.

In another embodiment, the method may include the additional step of, in response to correlating the change in the behavior of the first application program with the meta-metadata, capturing a plurality of meta-metadata for the database object. Thus, in response to detecting a change in a behavior of a second application program when the second application program accesses the database object, a cause of the change in the behavior of the second application program can be predicted based on the captured plurality of meta-metadata for the database object.

While the present invention has been particularly shown and described with reference to a preferred embodiment, it will be understood by those skilled in the art that various changes in form and detail may be made therein without departing from the spirit and scope of the invention. For example, while the method described herein is related to synchronizing tables, any type of data structure may be synchronized in accordance with the present disclosure. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for managing applications that utilize a database, the method comprising:

a processor of a data processing system executing code that performs the functions of:

defining a plurality of metadata that describe operational characteristics of a database object;

defining a meta-metadata for each metadata in the plurality of metadata, wherein the meta-metadata describes a metadata variance for each metadata in the plurality of metadata;

providing, to a first application program, access to the database object; and correlating a change in a behavior of the first application program with the meta-metadata when the first application program accesses the database object.

2. The method of claim 1, further comprising:

diagnosing a cause of the change in application behavior of the first application program, wherein the cause is based on the meta-metadata.

3. The method of claim 1, further comprising:

identifying a second application program that is executing whenever the change in application behavior to the first application occurs in conjunction with the meta-metadata; and modifying a fault-diagnosis routine based on identifying the second application program executing, wherein the fault-diagnosis routine identifies a feature of the database object that caused the change in the behavior of the first application program.

4. The method of claim 1, further comprising:

identifying a computer resource that is being utilized whenever the change in application behavior to the first application occurs in conjunction with the meta-metadata; and modifying a fault-diagnosis routine based on identifying the computer resource that is being utilized, wherein the fault-diagnosis routine identifies a feature of the database object that caused the change in the behavior of the first application program.

5. The method of claim 4, wherein the computer resource is a memory in a client computer that is executing the first application.

6. The method of claim 4, wherein the computer resource is a processor that is executing the first application.

7. The method of claim 1, wherein the operational characteristic of the database object describes a size growth of the database object.

8. The method of claim 7, wherein the metadata variance is a rate of change of the size growth of the database object, and wherein the meta-metadata describes the rate of change of the size growth of the database object.

9. The method of claim 1, wherein the operational characteristic of the database object describes a frequency of serial accesses of data in the database object.

10. The method of claim 9, wherein the metadata variance is a rate of change of the frequency of serial access of data in the database object, and wherein the meta-metadata describes the rate of change of the frequency of serial accesses of data in the database object.

11. The method of claim 1, wherein the operational characteristic of the database object describes a frequency of indexed accesses of data in the database object.

12. The method of claim 11, wherein the metadata variance is a rate of change of the frequency of indexed accesses of data in the database object, and wherein the meta-metadata describes the rate of change of the frequency of indexed accesses of data in the database object.

13. The method of claim 1, further comprising:

in response to correlating the change in the behavior of the first application program with the meta-metadata, capturing a plurality of meta-metadata for the database object; and in response to detecting a change in a behavior of a second application program when the second application program accesses the database object, predicting a cause of the change in the behavior of the second application program based on the captured plurality of meta-metadata for the database object.

14. The method of claim 1, wherein the database object is a database table.

15. A system comprising:

a processor;

a data bus coupled to the processor;

a memory coupled to the data bus; and a computer-usable medium embodying computer program code, the computer program code comprising instructions executable by the processor and configured for managing applications that utilize a database by performing the steps of:

defining a plurality of metadata that describe operational characteristics of a database object;

defining a meta-metadata for each metadata in the plurality of metadata, wherein the meta-metadata describes a metadata variance for each metadata in the plurality of metadata;

providing, to a first application program, access to the database object; and correlating a change in a behavior of the first application program with the meta-metadata when the first application program accesses the database object.

16. The system of claim 15, wherein the instructions are further configured for:

diagnosing a cause of the change in application behavior of the first application program, wherein the cause is based on the meta-metadata.

17. A computer-readable storage medium embodying computer program code for managing applications that utilize a database, the computer program code comprising computer executable instructions configured for:

defining a plurality of metadata that describe operational characteristics of a database object;

defining a meta-metadata for each metadata in the plurality of metadata, wherein the meta-metadata describes a metadata variance for each metadata in the plurality of metadata;

providing, to a first application program, access to the database object; and correlating a change in a behavior of the first application program with the meta-metadata when the first application program accesses the database object.

18. The computer-readable storage medium of claim 17, wherein the computer executable instructions are further configured for:

diagnosing a cause of the change in application behavior of the first application program, wherein the cause is based on the meta-metadata.

19. The computer-readable storage medium of claim 17, wherein the computer-usable medium is a component of a remote server, and wherein the computer executable instructions are deployable to a client computer from the remote server.

20. The computer-readable storage medium of claim 17, wherein the computer executable instructions are capable of being provided by a service provider to a customer on an on-demand basis.

* * * * *